United States Patent

Kimura et al.

(10) Patent No.: US 11,040,572 B2
(45) Date of Patent: *Jun. 22, 2021

(54) RUBBER COMPOSITION FOR TIRE, AND PNEUMATIC TIRE

(71) Applicant: THE YOKOHAMA RUBBER CO., LTD., Tokyo (JP)

(72) Inventors: Kazushi Kimura, Hiratsuka (JP); Hirokazu Kageyama, Hiratsuka (JP); Satoshi Mihara, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 155 days.

This patent is subject to a terminal disclaimer.

(21) Appl. No.: 15/754,119

(22) PCT Filed: Aug. 26, 2016

(86) PCT No.: PCT/JP2016/075093
§ 371 (c)(1),
(2) Date: Feb. 21, 2018

(87) PCT Pub. No.: WO2017/034033
PCT Pub. Date: Mar. 2, 2017

(65) Prior Publication Data
US 2018/0281520 A1    Oct. 4, 2018

(30) Foreign Application Priority Data

Aug. 26, 2015 (JP) .............................. JP2015-166976
Dec. 7, 2015 (JP) .............................. JP2015-238199

(51) Int. Cl.
| | | |
|---|---|---|
| *B60C 1/00* | (2006.01) | |
| *C08K 9/08* | (2006.01) | |
| *C08K 3/04* | (2006.01) | |
| *C08K 3/36* | (2006.01) | |
| *C08L 101/00* | (2006.01) | |
| *C08L 91/00* | (2006.01) | |
| *C08L 9/06* | (2006.01) | |
| *C08L 7/00* | (2006.01) | |
| *C08L 9/08* | (2006.01) | |
| *C08G 18/69* | (2006.01) | |
| *C08G 18/10* | (2006.01) | |
| *C08L 75/14* | (2006.01) | |
| *B60C 11/00* | (2006.01) | |

(52) U.S. Cl.
CPC .............. *B60C 1/0016* (2013.01); *B60C 1/00* (2013.01); *C08K 3/04* (2013.01); *C08K 3/36* (2013.01); *C08L 7/00* (2013.01); *C08L 9/06* (2013.01); *C08L 9/08* (2013.01); *C08L 91/00* (2013.01); *C08L 101/00* (2013.01); *B60C 2011/0025* (2013.01); *C08G 18/10* (2013.01); *C08G 18/69* (2013.01); *C08L 75/14* (2013.01); *C08L 2205/22* (2013.01); *C08L 2207/53* (2013.01)

(58) Field of Classification Search
CPC . B60C 1/0016; C08L 2207/53; C08L 2205/22
See application file for complete search history.

(56) References Cited

U.S. PATENT DOCUMENTS

| 9,982,116 B2 * | 5/2018 | Kimura | ................... C08K 3/36 |
| 2014/0100321 A1 * | 4/2014 | Maejima | ................... C08L 7/00 |
| | | | 524/506 |
| 2016/0237253 A1 | 8/2016 | Kakubo et al. | |

FOREIGN PATENT DOCUMENTS

| EP | 3 272 803 A1 | 1/2018 |
| JP | 2010-090203 A | 4/2010 |
| JP | 2012-211316 A | 11/2012 |
| JP | 2013-173816 A | 9/2013 |
| JP | 2013-224355 A | 10/2013 |
| JP | 2014-062168 A | 4/2014 |
| JP | 2015-067635 A | 4/2015 |
| WO | 2016/148278 A1 | 9/2016 |

OTHER PUBLICATIONS

Machine translation of JP 2012-211316 A, published Nov. 1, 2012.*
Extended European search report dated Mar. 18, 2019, becoming known to applicant Mar. 29, 2019, issued in corresponding EP patent application No. 16839380.9.

* cited by examiner

*Primary Examiner* — Vickey Nerangis
(74) *Attorney, Agent, or Firm* — Carrier Blackman & Associates, P.C.; William D. Blackman; Joseph P. Carrier (57) ABSTRACT

A rubber composition for a tire contains 100 parts by mass of a diene rubber (A) and from 1 to 60 parts by mass of an organic microparticle (B); an average particle size of the organic microparticle (B) being from 0.001 to 100 μm, the organic microparticle (B) having a complex structure composed of a compatible component that is compatible with the diene rubber (A) and an incompatible component that is not compatible with the diene rubber (A), the complex structure having an inner part in which an amount of the incompatible component is greater than an amount of compatible component, and an outer part which covers at least a part of the inner part and in which the amount of the compatible component is greater than an amount of the incompatible component. A pneumatic tire including such rubber composition has a desirable elongation, rigidity, durability, and wear resistance.

15 Claims, 1 Drawing Sheet

FIG. 2

RUBBER COMPOSITION FOR TIRE, AND PNEUMATIC TIRE

TECHNICAL FIELD

The present invention relates to a rubber composition for tires and a pneumatic tire.

BACKGROUND ART

Conventionally, fuel efficiency of vehicles has been enhanced by suppressing heat build-up by reducing tire rolling resistance; however, in recent years, further enhancement in fuel efficiency has been demanded, and even better low heat build-up has been required for treads, which occupy high proportion in a tire among tire members.

To solve such problems, in recent years, silica has been used as a reinforcing filler of a tire tread.

However, silica exhibits less affinity to rubber compared to that of carbon black and exhibits less reinforcement effect.

To achieve a reinforcing property at the same degree as the reinforcing property of carbon black, attempts have been made to enhance dispersibility of silica and to enhance reinforcing property by chemically binding a rubber and silica. Specifically, addition of a silane coupling agent, use of a terminal-modified SBR for silica, or the like has been studied.

Furthermore, a method of reducing the compounded amount of silica as a reinforcing filler and the use of a filler having a small reinforcement action have been known as the methods to satisfy low heat build-up. However, these methods had problems because wear resistance performance and/or grip performance is significantly decreased.

In response to such problems, for example, Patent Document 1 proposes "a rubber composition for a tire tread, the rubber composition comprising: (A) a diene rubber containing a vinyl group, (B) a silica having a nitrogen adsorption specific surface area of 30 to 500 $m^2/g$ and/or a carbon black having a nitrogen adsorption specific surface area of 22 to 250 $m^2/g$, and (C) an unvulcanized composite microparticle containing a compound having two or more mercapto groups in each molecule" ([Claim 1]).

CITATION LIST

Patent Literature

Patent Document 1: JP 2010-090203 A

SUMMARY OF INVENTION

Technical Problem

However, when the inventors of the present invention investigated the rubber composition described in Patent Document 1, it was found that elongation at break may be small, and rigidity, durability, and wear resistance may be poor when a tire is formed.

An object of the present invention is to provide a rubber composition for tires, the rubber composition having a large elongation at break and exhibiting excellent rigidity, durability, and wear resistance when formed into a tire, as well as to provide a pneumatic tire using the rubber composition.

Solution to Problem

As a result of diligent research to solve the problems described above, the inventors of the present invention found that a pneumatic tire having a large elongation at break and exhibiting excellent rigidity, durability, and wear resistance can be produced by blending, into a diene rubber, an organic microparticle having a complex structure having an inner part containing a component that is not compatible with the diene rubber as a main component and an outer part containing a component that is compatible with the diene rubber as a main component, and thus completed the present invention.

Specifically, the inventors discovered that the object described above can be achieved by the following features.

[1] A rubber composition for a tire, the rubber composition containing:
100 parts by mass of a diene rubber (A); and
from 1 to 60 parts by mass of an organic microparticle (B);
an average particle size of the organic microparticle (B) being from 0.001 to 100 μm;
the organic microparticle (B) being a complex structure composed of a compatible component that is compatible with the diene rubber (A) and an incompatible component that is not compatible with the diene rubber (A);
the complex structure having an inner part having an amount of the incompatible component greater than an amount of the compatible component, and an outer part that covers at least a part of the inner part and that has an amount of the compatible component greater than an amount of the incompatible component;
the complex structure being formed into a microparticle by crosslinking a crosslinkable oligomer or polymer (b1) that is compatible with the diene rubber (A) and a crosslinkable oligomer or polymer (b2) that is not compatible with the diene rubber (A) in water, an organic solvent, the crosslinkable oligomer or polymer (b1), the crosslinkable oligomer or polymer (b2), or the diene rubber (A).

[2] The rubber composition for a tire according to [1], where the complex structure is a structure selected from the group consisting of a microphase-separated structure, a multi-layered structure, and a random alloy structure.

[3] The rubber composition for a tire according to [2], where the microphase-separated structure is a structure in which the compatible component and the incompatible component are microphase-separated and which is selected from the group consisting of a spherical domain structure, a cylindrical structure, and a lamellar structure.

[4] The rubber composition for a tire according to [2], where the multi-layered structure is a core-shell structure having a core part having an amount of the incompatible component greater than an amount of the compatible component and a shell part having an amount of the compatible component greater than an amount of the incompatible component.

[5] The rubber composition for a tire according to [2], where the random alloy structure is an alloy structure having a microparticle structure in which the compatible component and the incompatible component are independent each other and in which at least a part of the microparticles is gathered randomly in a form selected from the group consisting of a primary particle, a secondary particle (aggregate), and a tertiary particle (agglomerate).

[6] The rubber composition for a tire according to any one of [1] to [5], where the complex structure is a microparticle obtained by crosslinking and micronizing the crosslinkable oligomer or polymer (b2) in a dispersion liquid containing water or an organic solvent as a dispersion medium, and then forming powder by removing the dispersion medium.

[7] The rubber composition for a tire according to any one of [1] to [6], where the complex structure is a microparticle obtained by crosslinking and micronizing the crosslinkable oligomer or polymer (b2) in the crosslinkable oligomer or polymer (b1) or the diene rubber (A).

[8] The rubber composition for a tire according to any one of [1] to [7], where the complex structure is a core-shell structure containing a non-diene polymer that is not compatible with the diene rubber (A) and a diene polymer that is compatible with the diene rubber (A); and the complex structure is composed of a core part having greater than 50 mass % of the non-diene polymer and a shell part having greater than 50 mass % of the diene polymer.

[9] The rubber composition for a tire according to any one of [1] to [8], the rubber composition further containing from 1 to 100 parts by mass of a carbon black and/or a white filler (C) per 100 parts by mass of the diene rubber (A).

[10] The rubber composition for a tire according to any one of [1] to [9], where the diene rubber (A) contains at least 50 mass % of a styrene-butadiene rubber.

[11] The rubber composition for a tire according to any one of [1] to [9], where the diene rubber (A) contains from 60 to 100 mass % of a natural rubber.

[12] A pneumatic tire including the rubber composition for a tire described in any one of [1] to [11] in a tire tread.

Advantageous Effects of Invention

As described below, according to the present invention, a rubber composition for tires, the rubber composition having a large elongation at break and exhibiting excellent rigidity, durability, and wear resistance when formed into a tire, as well as a pneumatic tire using the rubber composition can be provided.

DESCRIPTION OF EMBODIMENTS

Rubber Composition for Tire

The rubber composition for tires according to an embodiment of the present invention contains 100 parts by mass of a diene rubber (A) and from 1 to 60 parts by mass of an organic microparticle (B); an average particle size of the organic microparticle (B) being from 0.001 to 100 μm, the organic microparticle (B) having a complex structure composed of a compatible component that is compatible with the diene rubber (A) and an incompatible component that is not compatible with the diene rubber (A).

Furthermore, the complex structure has an inner part having an amount of the incompatible component greater than an amount of the compatible component, and an outer part that covers at least a part of the inner part and that has an amount of the compatible component greater than an amount of the incompatible component.

Furthermore, the complex structure is formed into a microparticle by crosslinking a crosslinkable oligomer or polymer (b1) that is compatible with the diene rubber (A) and a crosslinkable oligomer or polymer (b2) that is not compatible with the diene rubber (A) in water, an organic solvent, the crosslinkable oligomer or polymer (b1), the crosslinkable oligomer or polymer (b2), or the diene rubber (A). Preferably, the crosslinkable oligomer or polymer (b1) and the crosslinkable oligomer or polymer (b2) are processed stepwisely and separately to form a microparticle, or are mixed or reacted to form a microparticle.

In an embodiment of the present invention, by using the rubber composition containing the organic microparticle (B) as described above, a large elongation at break, as well as excellent rigidity, durability, and wear resistance when a tire is formed can be achieved.

Although the reason is not clear in detail, it is assumed to be as follows.

Unlike Patent Document 1, the microparticles are organic microparticles formed by crosslinking the crosslinkable oligomer or polymer and the outer part thereof is a constituent that is compatible with the diene rubber (A) which serves as a matrix of the rubber composition. Therefore, it is conceived that elongation at break is improved and rigidity, durability, and wear resistance are enhanced when a tire is formed because the microparticles do not become the starting point of the breakage of the rubber after the crosslinking and disperse locally applied strain.

The compositions contained in the rubber composition for tires according to an embodiment of the present invention are described in detail below.

Diene Rubber (A)

The diene rubber (A) contained in the rubber composition for tires according to an embodiment of the present invention is not particularly limited as long as the diene rubber (A) is a diene rubber having a double bond in the main chain. Specific examples thereof include a natural rubber (NR), isoprene rubber (IR), butadiene rubber (BR), acrylonitrile-butadiene rubber (NBR), styrene-butadiene rubber (SBR), styrene-isoprene rubber (SIR), and styrene-isoprene-butadiene rubber (SIBR). One type of these may be used alone, or a combination of two or more types may be used.

Furthermore, the diene rubber (A) may be a derivative formed by modifying a terminal and/or side chain of the rubbers described above with an amino group, an amide group, a silyl group, an alkoxy group, a carboxy group, a hydroxy group, an epoxy group, and the like.

Among these, use of an NR, BR, and/or SBR is preferable, and use of an SBR is more preferable.

In an embodiment of the present invention, preferably at least 50 mass % of the diene rubber (A) is an SBR, and more preferably from 70 to 100 mass % of the diene rubber (A) is an SBR, from the perspective of achieving excellent rigidity of the tire to be produced and excellent wear resistance, grip performance, and low rolling resistance.

Furthermore, in an embodiment of the present invention, preferably from 60 to 100 mass %, and more preferably from 70 to 100 mass %, of the diene rubber (A) is a natural rubber because tires for heavy duty vehicles, such as trucks and buses, (heavy duty tires) exhibit excellent wear resistance.

Organic Microparticle (B)

The organic microparticles (B) contained in the rubber composition for tires according to an embodiment of the present invention have an average particle size of 0.001 to 100 μm, preferably 0.01 to 50 μm, and more preferably 0.05 to 30 μm.

Note that "average particle size" of the organic microparticles (B) refers to the value obtained by subjecting a cross section of a vulcanized test sample of a rubber composition for tires to image analysis with an electron microscope (magnification:

approximately from 500 to 2000 times), measuring maximum lengths of at least 10 particles randomly chosen of the observed elastic microparticles (B), and averaging the lengths.

In an embodiment of the present invention, the organic microparticle (B) is a complex structure composed of a compatible component that is compatible with the diene rubber (A) and an incompatible component that is not compatible with the diene rubber (A).

Furthermore, the complex structure is a structure having an inner part having an amount of the incompatible component greater than an amount of the compatible component, and an outer part that covers at least a part of the inner part and that has an amount of the compatible component greater than an amount of the incompatible component.

The proportion of the incompatible component in the inner part is preferably from 10 to 100 mass %, and the proportion of the compatible component in the outer part is preferably from 10 to 100 mass %. Note that both the lower limit value of the proportion of the incompatible component in the inner part and the lower limit value of the proportion of the compatible component in the outer part are not greater than 50 mass % because cases where new particles (secondary particles) are formed by fixation or adhesion of particles, even when the particles are organic microparticles having a core-shell structure in which 100 mass % of the inner part is formed from the incompatible component and 100 mass % of the outer part is formed from the compatible component as primary particles, have been taken into consideration, for example.

Furthermore, "compatible component that is compatible (with the diene rubber (A))" does not mean a compatible component that is compatible with all the rubber components included in the diene rubber (A) but means a component that functions to allow each of specific components used in the diene rubber (A) and the outer part of the organic microparticles (B) to become compatible to each other due to similarities in chemical characteristics, such as molecular structure, polarity, and SP value (solubility parameter).

Furthermore, "incompatible component that is not compatible (with the diene rubber (A))" does not mean an incompatible component that is not compatible with all the rubber components included in the diene rubber (A) but means a component that functions to allow each of specific components used in the diene rubber (A) and the inner part of the organic microparticles (B) to become incompatible because the specific components repel each other due to differences in chemical characteristics, such as molecular structure, polarity, and SP value (solubility parameter).

Preferred examples of the complex structure of the organic microparticles (B) include microphase-separated structures, multi-layered structures, and random alloy structures.

Figure 1A:
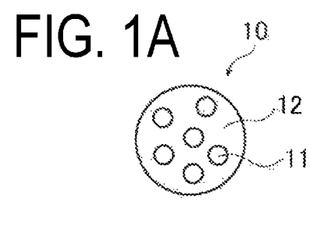
FIGS. 1A to 1F illustrate schematic cross-sectional views of organic microparticles blended in rubber compositions for tires according to embodiments of the present invention.
Figure 1B:
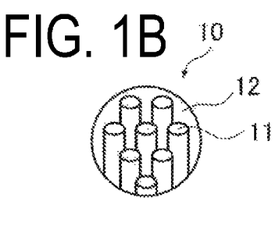
Figure 1C:
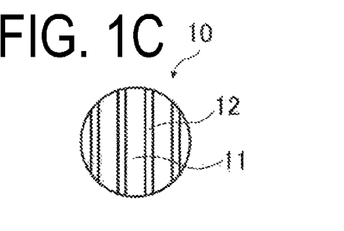

Note that examples of the microphase-separated structure include spherical domain structures, cylindrical (cylinder) structures, and lamellar structures in which the compatible component and the incompatible component are microphase-separated. Specific examples thereof include a spherical domain structure illustrated in FIG. 1A (reference sign 11: inner part; reference sign 12: outer part), a cylindrical structure illustrated in FIG. 1B (reference sign 11: inner part; reference sign 12: outer part), and a lamellar structure illustrated in FIG. 1C (reference sign 11: inner part; reference sign 12: outer part).

Figure 1D:
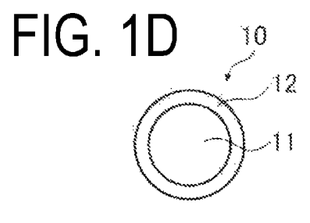
Figure 1E:
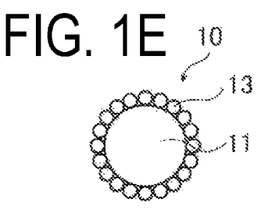

Furthermore, examples of the multi-layered structure include core-shell structures having a core part having an amount of the incompatible component greater than an amount of the compatible component and a shell part having an amount of the compatible component greater than an amount of the incompatible component. Specific examples thereof include a core-shell structure illustrated in FIG. 1D (reference sign 11: inner part; reference sign 12: outer part) and a core-shell structure illustrated in FIG. 1E (reference sign 11: inner part; reference sign 13: outer part) having a shell part formed from microparticles.

Figure 1F:
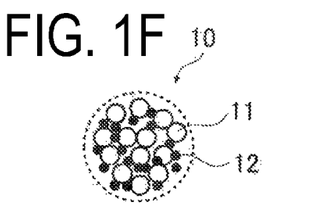

Furthermore, examples of the random alloy structure include alloy structures having a microparticle structure in which the compatible component and the incompatible component are independent each other and in which at least a part of microparticles is gathered randomly in a form selected from the group consisting of a primary particle, a secondary particle (aggregate), and a tertiary particle (agglomerate). Specific examples thereof include random alloy structures illustrated in FIG. 1F (reference sign 11: inner part; reference sign 12: outer part) in which the compatible component and the incompatible component each independently form primary particles, and these primary particles are randomly gathered to form a secondary particle.

Furthermore, in an embodiment of the present invention, the inner part is formed into a microparticle by using a crosslinkable oligomer or polymer (b1) that is compatible with the diene rubber (A) and a crosslinkable oligomer or polymer (b2) that is not compatible with the diene rubber (A) and crosslinking the crosslinkable oligomer or polymer (b2) in water, an organic solvent, the crosslinkable oligomer or polymer (b1), or the diene rubber (A).

Note that the average particle size of the inner part (microparticle) is substantially the same as the average particle size of the organic microparticles (B). The average particle size is preferably from 0.001 to 100 μm, more preferably from 0.01 to 50 μm, and even more preferably from 0.05 to 30 μm.

Inner Part

The crosslinkable oligomer or polymer (b2) constituting the inner part of the organic microparticles (B) is not particularly limited as long as the crosslinkable oligomer or polymer (b2) is an oligomer or polymer that is not compatible with the diene rubber (A) and that is crosslinkable.

Examples of the crosslinkable oligomer or polymer (b2) include polyether-based, polyester-based, polyolefin-based, polycarbonate-based, saturated hydrocarbon-based, acrylic-based, or siloxane-based polymers or copolymers.

Among these, for example, from the perspective of producing a tough urethane rubber, a polyether-based or polycarbonate-based copolymer is preferable, and a polycarbonate-based copolymer is more preferable.

Examples of the polycarbonate-based copolymer include copolymers obtained by transesterification reaction of dialkyl carbonate and a polyol compound (e.g. 1,6-hexanediol, 1,4-butanediol, and 1,5-pentanediol); and copolymers obtained by condensation reaction of polycarbonatediol and a diisocyanate compound (e.g. 2,4-tolylene diisocyanate, 2,6-tolylene diisocyanate, 4,4'-diphenylmethane diisocyanate, and 2,4'-diphenylmethane diisocyanate) (hereinafter, also abbreviated as "polycarbonate urethane prepolymer").

On the other hand, specific examples of the crosslinkable functional group contained in the crosslinkable oligomer or polymer (b2) include a hydroxy group, a hydrolyzable silyl group, a silanol group, an isocyanate group, a (meth)acryloyl group, an allyl group, a carboxy group, an acid anhydride group, and an epoxy group.

Among these, a hydrolyzable silyl group or an acid anhydride group is preferably contained from the perspective of achieving excellent wear resistance of the pneumatic tire to be produced.

Note that, in this specification, "(meth)acryloyloxy group" refers to an acryloyloxy group ($CH_2$=CHCOO—) or a methacryloyloxy group ($CH_2$=C($CH_3$)COO—).

From the perspective of ease in forming a relatively uniform form, the inner part may be a microparticle obtained by micronizing the crosslinkable oligomer or polymer (b2) in a dispersion liquid containing water or an organic solvent (e.g., MEK, MIBK, butyl cellosolve, and cyclohexanone) as a dispersion medium, and then removing the dispersion medium and performing pulverization.

Furthermore, the core part is preferably prepared by using additives, such as surfactants, emulsifiers, dispersing agents, and silane coupling agents when the micronization is performed in the dispersion liquid.

Furthermore, from the perspective of ease in forming a uniform form while process of removing water and/or organic solvent is omitted, the inner part is preferably formed by micronizing the crosslinkable oligomer or polymer (b2) described above in the crosslinkable oligomer or polymer (b1) that is compatible with the diene rubber (A) described above or in the diene rubber (A) described above.

Outer Part

As described above, the outer part of the organic microparticles (B) is a part having an amount of the compatible component greater than an amount of the incompatible component, and covering at least a part of the inner part.

Examples of the compatible component, i.e. the crosslinkable oligomer or polymer (b1) that is compatible with the diene rubber (A) include an aliphatic, saturated hydrocarbon-based, or plant-derived polymer or copolymer.

Examples of the aliphatic polymer or copolymer include liquid diene polymers, such as polyisoprene, polybutadiene, and styrene-butadiene copolymer; chloroprene rubber; butyl rubber; and nitrile rubber.

Furthermore, examples of the saturated hydrocarbon-based polymer or copolymer include hydrogenated polyisoprene, hydrogenated polybutadiene, ethylene propylene, epichlorohydrin, chlorinated polyethylene, chlorosulfonated polyethylene, hydrogenated nitrile rubber, polyisobutylene, and acrylic rubber.

Furthermore, examples of the plant-derived polymer or copolymer include plant oils and fats, such as castor oil and soybean oil; and various elastomers derived from polyester polyol or the like formed by modifying polylactic acid or the like.

Among these, an aliphatic polymer or copolymer is preferable, and from the perspective of crosslinking together with the diene rubber (A) during vulcanization of the rubber composition and achieving excellent wear resistance of the tire, a liquid diene polymer is more preferable.

Examples of commercially available product of the liquid polyisoprene include Kuraprene LIR-30 and Kuraprene LIR-50 (both available from Kuraray Co., Ltd.), and Poly ip (available from Idemitsu Kosan Co., Ltd.). Examples of commercially available product of the modified-liquid polyisoprene include Kuraprene LIR-403 (ethylene-isoprene copolymer), and Kuraprene LIR-410 (1,3-butadiene-isoprene copolymer) (both available from Kuraray Co., Ltd.).

Furthermore, examples of the liquid polybutadiene include homopolymer type, such as Kuraprene LBR-305 (available from Kuraray Co., Ltd.); copolymer type of 1,2-bond butadiene and 1,4-bond butadiene, such as Poly bd (available from Idemitsu Kosan Co., Ltd.); and copolymer type of ethylene, 1,4-bond butadiene, and 1,2-bond butadiene, such as Kuraprene L-SBR-820 (available from Kuraray Co., Ltd.).

In the present invention, the outer part covers at least a part of the inner part; however, the form of the covering is not particularly limited as long as the average particle size of the organic microparticles (B) is from 0.001 to 100 μm. Preferably, the covering is formed by microparticles having an average particle size of 0.01 to 10 μm.

Furthermore, in the present invention, the inner part and the outer part are preferably bonded together. Specifically, the inner part formed from the crosslinkable oligomer or polymer (b2) that is not compatible with the diene rubber (A) and the outer part formed from the crosslinkable oligomer or polymer (b1) that is compatible with the diene rubber (A) are preferably bonded via chemical bonding.

As shown in the synthetic examples in Examples described below, examples of the bonding method by chemical bonding as described above include a method of bonding the inner part and the outer part via urethane bonding, the method including synthesizing an isocyanate group-containing urethane prepolymer by adding a diisocyanate compound to a hydroxy group-containing oligomer, such as polytetramethylene ether glycol, polycarbonate diol, hydroxy group-containing polyisoprene, and hydroxy group-containing polybutadiene, then forming microparticles (inner part) by reacting this urethane prepolymer with trimethylolpropane in water to crosslink via urethane bonding, and then introducing hydroxy group-containing polyisoprene as a raw material to cover the inner part; and the like.

In an embodiment of the present invention, the organic microparticles (B) of the complex structure having the inner part and the outer part described above preferably have a core-shell structure containing a non-diene polymer that is not compatible with the diene rubber (A) and a diene polymer that is compatible with the diene rubber (A), and the core-shell structure is composed of a core part having greater than 50 mass % of the non-diene polymer and a shell part having greater than 50 mass % of the diene polymer. More preferably, the non-diene polymer contained in the core part and the diene polymer contained in the shell part are bonded via chemical boding.

"Non-diene polymer that is not compatible with the diene rubber (A)" does not mean a polymer that is not compatible with all the rubber components included in the diene rubber (A) but means a component that functions to allow each of specific components used in the diene rubber (A) and the core part of the organic microparticles (B) to become incompatible because the specific components repel each other due to differences in chemical characteristics, such as molecular structure, polarity, and SP value (solubility parameter).

"Diene polymer that is compatible with the diene rubber (A)" does not mean a polymer that is compatible with all the rubber components included in the diene rubber (A) but means a component that functions to allow each of specific components used in the diene rubber (A) and the shell part of the organic microparticles (B) to become compatible to each other due to similarities in chemical characteristics, such as molecular structure, polarity, and SP value (solubility parameter).

The non-diene polymer is preferably a polymer obtained by reacting at least a part of the crosslinkable functional group contained in the crosslinkable oligomer or polymer (b2) described above that is not compatible with the diene rubber (A). In this case, the non-diene polymer is a polymer derived from the crosslinkable oligomer or polymer (b2).

Examples of the non-diene polymer include urethane polymers, acrylic polymers, silicone polymers, olefin polymers, and epoxy resins. From the perspective of further enhancing toughness of the microparticles (B), a urethane polymer is preferable, and a urethane polymer having a polyether backbone or a polycarbonate backbone is more preferable, and a urethane polymer having a polycarbonate backbone is particularly preferable.

The diene polymer is preferably a polymer obtained by reacting at least a part of the crosslinkable functional group contained in the crosslinkable oligomer or polymer (b1) described above that is compatible with the diene rubber (A). In this case, the diene polymer is a polymer derived from the crosslinkable oligomer or polymer (b1).

Examples of the diene polymer includes polyisoprene, polybutadiene, styrene-butadiene copolymers, hydrogenated polyisoprene, and hydrogenated polybutadiene.

In an embodiment of the present invention, the content of the organic microparticles (B) is from 1 to 60 parts by mass, preferably from 5 to 50 parts by mass, more preferably from 10 to 40 parts by mass, and even more preferably from 10 to 30 parts by mass, per 100 parts by mass of the diene rubber (A).

Furthermore, the content of the organic microparticles (B) is preferably from 1 to 50 mass %, more preferably from 1 to 40 mass %, and even more preferably from 5 to 30 mass %, relative to the total mass of the rubber composition for tires.

Carbon Black and/or White Filler (C)

The rubber composition for tires according to an embodiment of the present invention preferably contains a carbon black and/or white filler (C).

Carbon Black

Specific examples of the carbon black include furnace carbon blacks such as SAF, ISAF, HAF, FEF, GPE, and SRF, and one of these can be used alone, or two or more types can be used in combination.

Furthermore, the carbon black is preferably one having a nitrogen adsorption specific surface area ($N_2SA$) of 10 to 300 $m^2/g$, and more preferably 20 to 200 $m^2/g$, from the perspective of processability when the rubber composition is mixed, the reinforcing property of the pneumatic tire, and the like.

Note that the $N_2SA$ is a value of the amount of nitrogen adsorbed to the surface of carbon black, measured in accordance with JIS K6217-2 (2001), "Part 2: Determination of specific surface area—Nitrogen adsorption methods—Single-point procedures".

White Filler

Specific examples of the white filler include silica, calcium carbonate, magnesium carbonate, talc, clay, alumina, aluminum hydroxide, titanium oxide, and calcium sulfate. One of these can be used alone, or a combination of two or more can be used.

Among these, silica is preferable from the perspective of reinforcing property.

Specific examples of the silica include wet silica (hydrous silicic acid), dry silica (silicic anhydride), calcium silicate, aluminum silicate, and the like. One type of these can be used alone, or a combination of two or more types of these can be used.

Among these, wet silica is preferable from the perspective of balance of rolling resistance, grip performance, wear resistance, and the like.

The silica preferably has a CTAB adsorption specific surface area of 50 to 300 $m^2/g$ from the perspective of kneadability.

Note that the CTAB adsorption specific surface area is a value of the amount of n-hexadecyltrimethylammonium bromide adsorbed to the surface of silica measured in accordance with JIS K6217-3 (2001) "Part 3: Method for determining specific surface area—CTAB adsorption method".

In an embodiment of the present invention, the content of the carbon black and/or white filler (C) is preferably from 1 to 100 parts by mass, more preferably from 40 to 90 parts by mass, and even more preferably from 45 to 80 parts by mass, per 100 parts by mass of the diene rubber (A).

Note that the content of the carbon black and/or white filler (C) indicates the content of the carbon black when only the carbon black is contained, or indicates the content of the white filler when only the white filler is contained, or indicates the total content of the carbon black and the white filler when these are contained.

Silane Coupling Agent

When the rubber composition for tires according to an embodiment of the present invention contains the white filler (especially silica) described above, the rubber composition preferably contains a silane coupling agent because it improves the reinforcing performance of the tire.

When the silane coupling agent is compounded, the content thereof is preferably from 0.1 to 20 parts by mass, and more preferably from 4 to 12 parts by mass, per 100 parts by mass of the white filler.

Specific examples of the above silane coupling agent include bis(3-triethoxysilylpropyl)tetrasulfide, bis(3-triethoxysilylpropyl)trisulfide, bis(3-triethoxysilylpropyl)disulfide, bis(2-triethoxysilylethyl)tetrasulfide, bis(3-trimethoxysilylpropyl)tetrasulfide, bis(2-trimethoxysilylethyl) tetrasulfide, 3-mercaptopropyltrimethoxysilane, 3-mercaptopropyltriethoxysilane, 2-mercaptoethyltrimethoxysilane, 2-mercaptoethyltriethoxysilane, 3-trimethoxysilylpropyl-N,N-dimethylthiocarbamoyl tetrasulfide, 3-triethoxysilylpropyl-N,N-dimethylthiocarbamoyl tetrasulfide, 2-triethoxysilylethyl-N,N-dimethylthiocarbamoyl tetrasulfide, 3-trimethoxysilylpropyl benzothiazole tetrasulfide, 3-triethoxysilylpropyl benzothiazole tetrasulfide, 3-triethoxysilylpropyl methacrylate monosulfide, 3-trimethoxysilylpropyl methacrylate monosulfide, bis(3-diethoxymethylsilylpropyl)tetrasulfide, 3-mercaptopropyldimethoxymethylsilane, dimethoxymethylsilylpropyl-N,N-dimethylthiocarbamoyl tetrasulfide, dimethoxymethylsilylpropyl benzothiazole tetrasulfide, and the like. One of these examples can be used alone, or a combination of two or more can be used.

Among these, from the perspective of effect of enhancing reinforcing property, use of bis-(3-triethoxysilylpropyl)tetrasulfide and/or bis-(3-triethoxysilylpropyl)disulfide is preferable. Specific examples thereof include Si69 (bis(3-triethoxysilylpropyl)tetrasulfide, available from Evonik Degussa), and Si75 (bis(3-triethoxysilylpropyl)disulfide, available from Evonik Degussa).

Other Components

In addition to the components described above, the rubber composition for tires according to an embodiment of the present invention can further contain various other components that are typically used in the rubber composition for tires, such as fillers such as calcium carbonate; chemical foaming agents, such as dinitroso pentamethylene tetramine (DPT), azodicarbon amide (ADCA), dinitroso pentastyrene tetramine, oxybis(benzenesulfonyl hydrazide) (OBSH), benzenesulfonyl hydrazide derivatives, ammonium bicarbonate that generates carbon dioxide, ammonium carbonate, sodium bicarbonate, toluenesulfonyl hydrazide that generates nitrogen, P-toluenesulfonylsemicarbazide, nitrososulfonyl azo compounds, N,N'-dimethyl-N,N'-dinitrosophthalamide, and P,P'-oxy-bis(benzenesulfonylsemicarbazide); vulcanizing agents, such as sulfur; vulcanization accelerators, such as sulfenamide-based, guanidine-based, thiazole-based, thiourea-based, and thiuram-based vulcanization accelerators; vulcanization accelerator aids, such as zinc oxide and stearic acid; waxes; aroma oils; anti-aging agents; and plasticizers.

The compounded content of these additives may be any quantity in the related art, as long as the object of the present invention is not impaired. For example, from 0.5 to 5 parts by mass of sulfur, from 0.1 to 5 parts by mass of a vulcanization accelerator, from 0.1 to 10 parts by mass of a vulcanization accelerator aid, from 0.5 to 5 parts by mass of an anti-aging agent, from 1 to 10 parts by mass of a wax, and from 5 to 30 parts by mass of an aroma oil may be blended per 100 parts by mass of the diene rubber (A).

Method of Producing Rubber Composition for Tire

The method of producing the rubber composition for tires according to an embodiment of the present invention is not particularly limited. Examples thereof include a method whereby each of the above-mentioned components is kneaded using a publicly known method and device (e.g. Banbury mixer, kneader, and roll).

Furthermore, the rubber composition for tires according to an embodiment of the present invention can be vulcanized or crosslinked under conventionally known vulcanizing or crosslinking conditions.

Pneumatic Tire

The pneumatic tire according to an embodiment of the present invention is a pneumatic tire that uses the rubber composition for tires according to an embodiment of the present invention described above in the tire treads.

Figure 2:
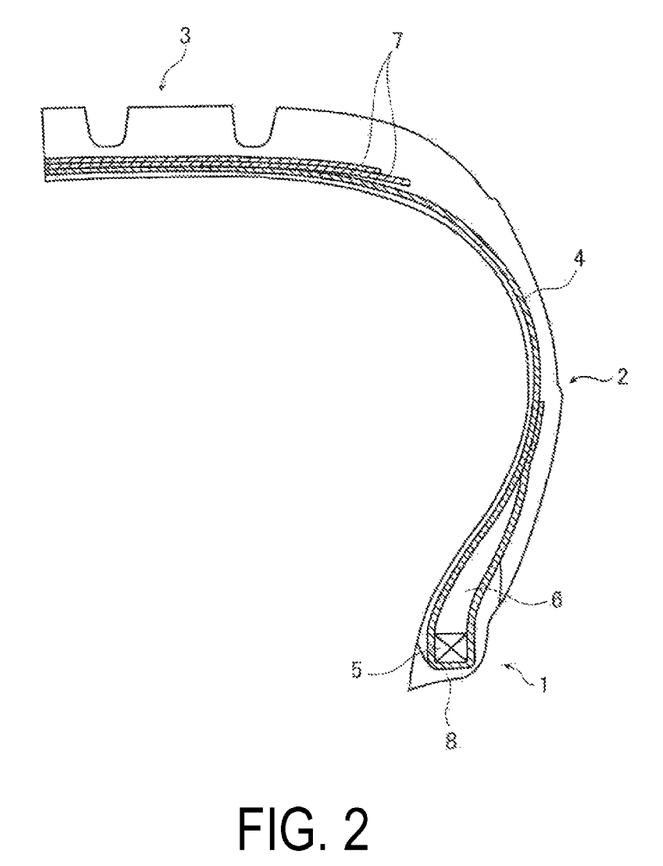
FIG. 2 is a schematic partial cross-sectional view of a tire that represents a pneumatic tire according to an embodiment of the present invention.

FIG. 2 is a schematic partial cross-sectional view of a tire that represents a pneumatic tire according to an embodiment of the present invention. However, the tire according to an embodiment of the present invention is not limited to the embodiment illustrated in FIG. 2.

In FIG. 2, reference sign 1 denotes a bead portion, reference sign 2 denotes a sidewall portion, and reference sign 3 denotes a tread portion formed from the rubber composition for tires according to an embodiment of the present invention.

In addition, a carcass layer 4, in which a fiber cord is embedded, is mounted between a left-right pair of bead portions 1, and ends of the carcass layer 4 are wound by being folded around bead cores 5 and a bead filler 6 from an inner side to an outer side of the tire.

In the tire tread portion 3, a belt layer 7 is provided along the entire periphery of the tire on the outer side of the carcass layer 4.

Additionally, rim cushions 8 are provided in portions of the bead portions 1 that are in contact with a rim.

The pneumatic tire according to an embodiment of the present invention can be produced by, for instance, forming a tire tread portion by vulcanization or crosslinking at a temperature corresponding to the type and compounding ratio of the diene rubber, vulcanizing agent or crosslinking agent, and vulcanization or crosslinking accelerator used in the rubber composition for tires according to an embodiment of the present invention.

EXAMPLES

Preparation of Organic Microparticle 1

A polycarbonate urethane prepolymer having an isocyanate terminal (reaction product 1) was obtained by reacting 200 g of polycarbonate diol (T6001, available from Asahi Kasei Corporation) and 100 g of 4,4'-diphenylmethane diisocyanate (Millionate MT, available from Nippon Polyurethane Industry Co., Ltd.) at 80° C. for 5 hours.

To 44 g of the obtained urethane prepolymer (reaction product 1), 3.5 g of methyl isobutyl ketone (MIBK), 2.0 g of dimethylol butanoic acid (DMBA), and 1.5 g of triethylamine (TEA) were then mixed and agitated for 10 minutes.

Then, 77 g of water, 4.0 g of sorbitan acid-based surfactant (TW-0320V, available from Kao Corporation), and 0.06 g of dibutyltin dilaurate (DBTL) were added and agitated using an agitator equipped with a dissolver at a dissolver rotational speed of 1000 rpm for 10 minutes. Thereafter, the temperature was gradually raised to 70° C. and the agitation was continued for 1 hour to obtain a milky white emulsion solution.

Then, 44 g of the urethane prepolymer (reaction product 1) described above, 40 g of hydroxy group-containing liquid polyisoprene (Poly ip, available from Idemitsu Kosan Co., Ltd.), and 37 g of methyl isobutyl ketone (MIBK) were added and agitated at a rotational speed of 1000 rpm for 10 minutes.

Then, 77 g of water and 4.0 g of sorbitan acid-based surfactant (TW-0320V, available from Kao Corporation) were further added and agitated using an agitator equipped with a dissolver at a dissolver rotational speed of 1000 rpm for 10 minutes. Thereafter, the temperature was gradually raised to 70° C. and the agitation was continued for 30 minutes to obtain a milky white emulsion solution.

This solution was applied to a glass plate and the water was vaporized. When this was observed with a laser microscope, it was confirmed that spherical microparticles having a complex structure, in which a core part and a shell part were observed, and having an average particle size of 5 µm were produced.

The temperature was raised to 80° C. to vaporize water while this solution was agitated, and thus a white powder was obtained. This was used as organic microparticles 1.

Preparation of Organic Microparticle 2

Organic microparticles 2 were produced by the same method as for organic microparticles 1 except for using 44 g of hydroxy group-containing liquid polybutadiene (Poy bd R-45HT, available from Idemitsu Kosan Co., Ltd.) in place of the hydroxy group-containing liquid polyisoprene (Poly ip, available from Idemitsu Kosan Co., Ltd.).

Note that it was confirmed that the organic microparticles 2 are also spherical microparticles having a complex structure, in which a core part and a shell part were observed, and having an average particle size of 5 µm.

Preparation of Organic Microparticle 3

A polycarbonate urethane prepolymer having an isocyanate terminal (reaction product 2) was obtained by reacting 100 g of polycarbonate diol (T6001, available from Asahi Kasei Corporation), 43.5 g of 4,4'-diphenylmethane diisocyanate (Millionate MT, available from Nippon Polyurethane Industry Co., Ltd.), and 70 g of MIBK at 80° C. for 5 hours.

To a high-speed dissolver-type agitator, 210 g of the obtained urethane prepolymer (reaction product 2), 10 g of methyl isobutyl ketone (MIBK), 5.0 g of dimethylol butanoic acid (DMBA), 3.0 g of triethylamine (TEA), and 2.5 g of trimethylolpropane (TMP, available from Mitsubishi Gas Chemical Company, Inc.) were then added and agitated for 5 minutes.

Then, 200 g of water and 5.0 g of sorbitan acid-based surfactant (TW-0320V, available from Kao Corporation) were added and agitated at a dissolver rotational speed of 1000 rpm for 10 minutes.

Thereafter, separately from this, a polyisoprene prepolymer having an isocyanate terminal (reaction product 3) was obtained by reacting 200 g of hydroxy group-containing liquid polyisoprene (Poly ip, available from Idemitsu Kosan Co., Ltd.) and 40 g of 4,4'-diphenylmethane diisocyanate (Millionate MT, available from Nippon Polyurethane Industry Co., Ltd.) at 80° C. for 5 hours.

In the high-speed agitator above, 180 g of this urethane prepolymer (reaction product 3), 30 g of methyl isobutyl ketone (MIBK), 13 g of dimethylol butanoic acid (DMBA), and 6.5 g of triethylamine (TEA) were added and agitated at a rotational speed of 1000 rpm for 10 minutes.

Thereafter, the temperature was gradually raised to 70° C. and the agitation was continued for 30 minutes to obtain a milky white emulsion solution.

This solution was applied to a glass plate and water was vaporized. When this was observed with a laser microscope, it was confirmed that spherical microparticles having a complex structure, in which a core part and a shell part were observed, and having an average particle size of 5 μm were produced.

The temperature was raised to 80° C. to vaporize water while this solution was agitated, and thus a white powder was obtained. This was used as organic microparticles 3.

Preparation of Comparative Microparticle 1

A polycarbonate urethane prepolymer having an isocyanate terminal (reaction product 4) was obtained by reacting 200 g of polycarbonate diol (T6001, available from Asahi Kasei Corporation), 110.5 g of 4,4'-diphenylmethane diisocyanate (Millionate MT, available from Nippon Polyurethane Industry Co., Ltd.), and 40 g of MIBK at 80° C. for 5 hours.

To a high-speed dissolver-type agitator, 170 g of the obtained urethane prepolymer (reaction product 4), 50 g of methyl isobutyl ketone (MIBK), 5.0 g of dimethylol butanoic acid (DMBA), 3.0 g of triethylamine (TEA), 3.0 g of trimethylolpropane (TMP, available from Mitsubishi Gas Chemical Company, Inc.), and 5.0 g of xylylene diisocyanate (XDI, Takenate 500, available from Mitsui Chemicals, Inc.) were then added and agitated for 5 minutes.

Then, 200 g of water and 5.0 g of sorbitan acid-based surfactant (TW-0320V, available from Kao Corporation) were added and agitated at a dissolver rotational speed of 1000 rpm for 2 hours while the temperature was gradually raised to 70° C., and thus a milky white emulsion solution was obtained.

This solution was applied to a glass plate and water was vaporized. When this was observed with a laser microscope, it was confirmed that spherical microparticles having an average particle size of 20 μm were produced.

The temperature was raised to 80° C. to vaporize water while this solution was agitated, and thus a white powder was obtained. This was used as comparative microparticles 1.

Preparation of Comparative Microparticle 2

Using a high-speed dissolver-type agitator, 200 g of hydroxy group-containing liquid polyisoprene (Poly ip, available from Idemitsu Kosan Co., Ltd.), 35 g of xylylene diisocyanate (XDI, Takenate 500, available from Mitsui Chemicals, Inc.), 6 g of dimethylol butanoic acid (DMBA), 3 g of trimethylolpropane (TMP, available from Mitsubishi Gas Chemical Company, Inc.), and 150 g of methyl ethyl ketone (MEK) were agitated for 5 minutes. Then, 600 g of water and 15.0 g of nonionic surfactant (EMULGEN 104P, available from Kao Corporation) were added and agitated at a dissolver rotational speed of 1000 rpm for 4 hours while the temperature was gradually raised to 70° C., and thus a milky white emulsion solution was obtained.

This solution was applied to a glass plate and the water was vaporized. When this was observed with a laser microscope, it was confirmed that spherical microparticles having an average particle size of 20 μm were produced.

The temperature was raised to 80° C. to vaporize water while this solution was agitated, and thus a white powder was obtained. This was used as comparative microparticles 2.

Examples 1 to 4 and Comparative Examples 1 to 3

The components shown in Table 1 below were blended at the proportions (part by mass) shown in Table 1 below.

Specifically, a master batch was obtained by first kneading the components shown in Table 1 below, except the sulfur and the vulcanization accelerator, for 5 minutes in a 1.7-L sealed mixer, and then discharging the kneaded product when the temperature reached 150° C.

Next, a rubber composition was obtained by kneading the sulfur and the vulcanization accelerator with the obtained master batch using an open roll.

A vulcanized rubber sheet was then produced by vulcanizing the obtained rubber composition for 10 minutes at 170° C. in a mold for Lambourn abrasion (disk having a diameter of 63.5 mm and a thickness of 5 mm).

Elastic Modulus (M300)

For the produced vulcanized rubber sheet, a dumbbell-shaped JIS No. 3 test piece (thickness: 2 mm) was punched out, and 300% modulus (M300) was measured, in accordance with JIS K 6251 (2010), in a condition at 20° C. at a tensile test speed of 500 mm/min.

The measurement results are expressed as index values with the value of Comparative Example 1 expressed as an index of 100. A larger index value indicates higher elastic modulus.

Elongation at Break

For the produced vulcanized rubber sheet, a dumbbell-shaped JIS No. 3 test piece (thickness: 2 mm) was punched out, and elongation at break (EB) was measured, in accordance with JIS K 6251 (2010), in a condition at 20° C. at a tensile test speed of 500 mm/min.

The measurement results are expressed as index values with the value of Comparative Example 1 expressed as an index of 100. A larger index value indicates greater elongation at break.

Wear Resistance (Strength at Break)

For the produced vulcanized rubber sheet, a dumbbell-shaped JIS No. 3 test piece (thickness: 2 mm) was punched out, and strength at break (stress at break) was measured, in accordance with JIS K 6251 (2010), in a condition at a temperature of 100° C. at a tensile test speed of 500 mm/min.

The measurement results are expressed as index values with the value of Comparative Example 1 expressed as an index of 100. A larger index value indicates greater strength at break and excellent wear resistance when a tire is formed.

TABLE 1

| | Comparative Examples | | | Examples | | | |
|---|---|---|---|---|---|---|---|
| | 1 | 2 | 3 | 1 | 2 | 3 | 4 |
| SBR | 103.1 | 103.1 | 103.1 | 103.1 | 103.1 | 103.1 | 103.1 |
| BR | 25 | 25 | 25 | 25 | 25 | 25 | 25 |
| Silica | 70 | 70 | 70 | 70 | 70 | 70 | 70 |
| Carbon black | 10 | 10 | 10 | 10 | 10 | 10 | 10 |
| Comparative microparticle 1 | | 15 | | | | | |
| Comparative microparticle 2 | | | 15 | | | | |
| Organic microparticle 1 | | | | 15 | 25 | | |
| Organic microparticle 2 | | | | | | 15 | |
| Organic microparticle 3 | | | | | | | 15 |
| Silane coupling agent | 5 | 5 | 5 | 5 | 5 | 5 | 5 |
| Zinc oxide | 3 | 3 | 3 | 3 | 3 | 3 | 3 |
| Stearic acid | 2 | 2 | 2 | 2 | 2 | 2 | 2 |
| Anti-aging agent | 2 | 2 | 2 | 2 | 2 | 2 | 2 |
| Sulfur | 1.5 | 1.5 | 1.5 | 1.5 | 1.5 | 1.5 | 1.5 |
| Vulcanization accelerator 1 | 2 | 2 | 2 | 2 | 2 | 2 | 2 |
| Vulcanization accelerator 2 | 0.5 | 0.5 | 0.5 | 0.5 | 0.5 | 0.5 | 0.5 |
| Oil | 10 | 10 | 10 | 10 | 10 | 10 | 10 |
| Elastic modulus | 100 | 105 | 97 | 107 | 113 | 106 | 109 |
| Elongation at break | 100 | 86 | 91 | 110 | 106 | 105 | 103 |
| Wear resistance | 100 | 80 | 93 | 106 | 102 | 104 | 107 |

The components shown in Table 1 above are as follows.

SBR: hydroxy group-containing styrene-butadiene rubber (trade name: E581 (oil extended product in which 37.5 parts by mass of extender oil was added per 100 parts by mass of SBR))

BR: Butadiene rubber (Nipol 1220, available from Zeon Corporation)

Silica: 1165MP (available from Solvay)

Carbon black: Seast N (available from Tokai Carbon Co., Ltd.)

Silane coupling agent: TESP (Si 69, available from Evonik)

Zinc oxide: Zinc Oxide III (available from Seido Chemical Industry Co., Ltd.)

Stearic acid: stearic acid beads (available from Nippon Oil & Fats Co., Ltd.)

Anti-aging agent: 6PPD (available from Flexsys)

Sulfur: "Golden Flower" oil-treated sulfur powder (available from Tsurumi Chemical Industry Co., Ltd.)

Vulcanization accelerator 1: Vulcanization accelerator CBS (NOCCELER CZ-G, available from Ouchi Shinko Chemical Industrial Co., Ltd.)

Vulcanization accelerator 2: Sanceller D-G (available from Sanshin Chemical Industry Co., Ltd.)

Oil: Extract No. 4S (available from Showa Shell Sekiyu K.K.)

From the results shown in Table 1, it was found that all of the rubber compositions of Examples 1 to 4 containing the organic microparticles achieved large elongation at break, elastic modulus, and strength at break, and achieved excellent rigidity and durability when a tire is formed and excellent wear resistance than those of Comparative Examples 1 to 3 containing no organic microparticles.

Production of Rubber Compositions of Comparative Example 4 and Examples 5 to 14

The components shown in Table 2 below were blended in the proportions (part by mass) shown in Table 2 below.

Specifically, a master batch was obtained by first kneading (mixing) the components shown in Table 2 below, except the sulfur and the vulcanization accelerator, for 5 minutes in a 1.7-L sealed mixer, and then discharging the kneaded product when the temperature reached 150° C.

Next, each rubber composition of Comparative Example 4 and Examples 5 to 14 was obtained by kneading the sulfur and the vulcanization accelerator with the obtained master batch using an open roll.

Low Heat Build-Up (Tan δ (60° C.))

A vulcanized rubber sheet was prepared by press-vulcanizing each of the obtained (unvulcanized) rubber compositions for 30 minutes at 148° C. in a mold (15 cm×15 cm×0.2 cm).

Thereafter, the loss tangent (tan δ (60° C.)) was measured for each obtained vulcanized rubber sheet using a viscoelastic spectrometer (available from Toyo Seiki Seisaku-sho, Ltd.) under the following conditions: 10% initial strain, ±2% amplitude, 20 Hz frequency, and temperature of 60° C.

The results are shown in Table 2. The results are expressed as index value with the tan δ (60° C.) of Comparative Example 4 being assigned the index value of 100. A smaller index value indicates a smaller tan δ (60° C.), which indicates excellent low heat build-up when a tire is formed.

Wear Resistance

For the vulcanized rubber sheet produced as described above, abrasion loss was measured in accordance with JIS K 6264-1,2 (2005) using a Lambourn abrasion test machine (available from Iwamoto Seisakusho Co. Ltd.) at a temperature of 20° C. and at a slip ratio of 50%.

The results are shown in Table 2. The results are expressed as index values obtained using the following equation, with the amount of wear of Comparative Example 4 expressed as 100. A larger index value indicates smaller amount of wear, and thus excellent wear resistance of a formed tire.

Wear resistance=(amount of wear of Comparative Example 4/amount of wear of sample)×100

Toughness

Elongation at Break

For the produced vulcanized rubber sheet, a dumbbell-shaped JIS No. 3 test piece (thickness: 2 mm) was punched out, and elongation at break (EB) was measured, in accordance with JIS K 6251 (2010), in a condition at 20° C. at a tensile test speed of 500 mm/min.

The results are shown in Table 2. The measurement results are expressed as index values with the value of Comparative Example 4 expressed as an index of 100. A larger index value indicates greater elongation at break.

Strength at Break

For the produced vulcanized rubber sheet, a dumbbell-shaped JIS No. 3 test piece (thickness: 2 mm) was punched out, and strength at break (stress at break) was measured, in accordance with JIS K 6251 (2010), in a condition at a temperature of 100° C. at a tensile test speed of 500 mm/min.

The results are shown in Table 2. The measurement results are expressed as index values with the value of Comparative Example 4 expressed as an index of 100. A larger index value indicates greater strength at break.

TABLE 2

|  | Comparative Examples | Examples | | | | | | | | | |
| --- | --- | --- | --- | --- | --- | --- | --- | --- | --- | --- | --- |
|  | 4 | 5 | 6 | 7 | 8 | 9 | 10 | 11 | 12 | 13 | 14 |
| NR | 70 | 70 | 70 | 70 | 60 | 100 | 70 | 70 | 70 | 60 | 100 |
| BR | 30 | 30 | 30 | 30 | 40 |  | 30 | 30 | 30 | 40 |  |
| Silica |  | 50 | 40 | 30 | 50 | 50 |  |  |  |  |  |
| Carbon black | 60 |  |  |  |  |  | 50 | 40 | 30 | 50 | 50 |
| Organic microparticle 1 |  | 10 | 20 | 30 | 10 | 10 | 10 | 20 | 30 | 10 | 10 |
| Silane coupling agent |  | 4.0 | 3.2 | 2.4 | 4.0 | 4.0 |  |  |  |  |  |
| Zinc oxide | 2.5 | 2.5 | 2.5 | 2.5 | 2.5 | 2.5 | 2.5 | 2.5 | 2.5 | 2.5 | 2.5 |
| Stearic acid | 2.0 | 2.0 | 2.0 | 2.0 | 2.0 | 2.0 | 2.0 | 2.0 | 2.0 | 2.0 | 2.0 |
| Anti-aging agent | 1.0 | 1.0 | 1.0 | 1.0 | 1.0 | 1.0 | 1.0 | 1.0 | 1.0 | 1.0 | 1.0 |
| Sulfur | 1.4 | 1.4 | 1.4 | 1.4 | 1.4 | 1.4 | 1.4 | 1.4 | 1.4 | 1.4 | 1.4 |
| Vulcanization accelerator 3 | 1.7 | 1.7 | 1.7 | 1.7 | 1.7 | 1.7 | 1.7 | 1.7 | 1.7 | 1.7 | 1.7 |
| Vulcanization accelerator 4 | 1.5 | 1.5 | 1.5 | 1.5 | 1.5 | 1.5 | 1.5 | 1.5 | 1.5 | 1.5 | 1.5 |
| Tan δ (60° C.) | 100 | 96 | 91 | 86 | 93 | 96 | 97 | 95 | 88 | 95 | 98 |
| Wear resistance | 100 | 103 | 106 | 108 | 102 | 102 | 105 | 108 | 110 | 104 | 103 |
| Toughness Elongation at break | 100 | 105 | 112 | 107 | 104 | 107 | 115 | 113 | 109 | 105 | 117 |
| Strength at break | 100 | 104 | 113 | 109 | 102 | 106 | 114 | 115 | 110 | 106 | 116 |

The components shown in Table 2 above are as follows.
NR: STR (available from Zeon Corporation)
BR: Nipol BR1220 (available from Zeon Corporation)
Silica: Zeosil 1165MP (CTAB adsorption specific surface area: 152 m$^2$/g, available from Rhodia)
Carbon black: Seast 9M (nitrogen adsorption specific surface area: 142 m$^2$/g, available from Tokai Carbon Co., Ltd.)
Organic microparticles 1: microparticles produced as described above
Silane coupling agent: bis(3-(triethoxysilyl)propyl) tetrasulfide (Si 69, available from Evonic Degussa Corporation)
Zinc oxide: Zinc Oxide III (available from Seido Chemical Industry Co., Ltd.)
Stearic acid: Beads stearic acid YR (available from NOF Corporation)
Anti-aging agent: Amine-based anti-aging agent (Santflex 6PPD, available from Flexsys)
Sulfur: "Golden Flower" oil-treated sulfur powder (available from Tsurumi Chemical Industry Co., Ltd.)
Vulcanization accelerator 3: Vulcanization accelerator CBS (NOCCELER CZ-G, available from Ouchi Shinko Chemical Industrial Co., Ltd.)
Vulcanization accelerator 4: Vulcanization accelerator DPG (NOCCELER D, available from Ouchi Shinko Chemical Industrial Co., Ltd.)

From the results shown in Table 2, it was found that when the diene rubber having the content of the natural rubber of 60 to 100 mass % and the predetermined amount of the organic microparticles 1 were contained, both the low heat build-up and the wear resistance became excellent (Examples 5 to 14).

REFERENCE SIGNS LIST

1 Bead portion
2 Sidewall portion
3 Tire tread portion
4 Carcass layer
5 Bead core
6 Bead filler
7 Belt layer
8 Rim cushion
10 Organic microparticle
11 Inner part
12, 13 Outer part

The invention claimed is:

1. A rubber composition for a tire, the rubber composition comprising:
100 parts by mass of a diene rubber (A); and
from 1 to 60 parts by mass of an organic microparticle (B);
an average particle size of the organic microparticle (B) being from 0.001 to 100 μm;
the organic microparticle (B) being a complex structure composed of a compatible component compatible with the diene rubber (A) that is a crosslinkable oligomer or polymer (b1) which is selected from the group consisting of an aliphatic, saturated hydrocarbon-based, or plant-derived polymer and copolymer and an incompatible component not compatible with the diene rubber (A) that is a crosslinkable oligomer or polymer (b2) which is selected from the group consisting of polyether-based, polyester-based, polycarbonate-based, acrylic-based, or siloxane-based polymers and copolymers;
the complex structure having an inner part having an amount of the crosslinkable oligomer or polymer (b2) greater than an amount of the crosslinkable oligomer or polymer (b1), and an outer part that covers at least a part of the inner part and that has an amount of the crosslinkable oligomer or polymer (b1) greater than an amount of the crosslinkable oligomer or polymer (b2), wherein the inner part and the outer part are bonded via chemical bonding;
the complex structure being formed into a microparticle by crosslinking the crosslinkable oligomer or polymer (b1) and the crosslinkable oligomer or polymer (b2) in water, an organic solvent, the crosslinkable oligomer or polymer (b1), the crosslinkable oligomer or polymer (b2), or the diene rubber (A).

2. The rubber composition for a tire according to claim 1, wherein the complex structure is a structure selected from the group consisting of a microphase-separated structure, a multi-layered structure, and a random alloy structure.

3. The rubber composition for a tire according to claim 2, wherein the microphase-separated structure is a structure in which the crosslinkable oligomer or polymer (b1) and the crosslinkable oligomer or polymer (b2) are microphase-separated and which is selected from the group consisting of a spherical domain structure, a cylindrical structure, and a lamellar structure.

4. The rubber composition for a tire according to claim 2, wherein the multi-layered structure is a core-shell structure having a core part having an amount of the crosslinkable oligomer or polymer (b2) greater than an amount of the crosslinkable oligomer or polymer (b1), and a shell part having an amount of the crosslinkable oligomer or polymer (b1) greater than an amount of the crosslinkable oligomer or polymer (b2).

5. The rubber composition for a tire according to claim 2, wherein the random alloy structure is an alloy structure having a microparticle structure in which the crosslinkable oligomer or polymer (b1) and the crosslinkable oligomer or polymer (b2) are independent of each other, and in which at least a part of the microparticles is gathered randomly in a form selected from the group consisting of a primary particle, a secondary particle, and a tertiary particle.

6. The rubber composition for a tire according to claim 1, wherein the complex structure is a microparticle obtained by crosslinking and micronizing the crosslinkable oligomer or polymer (b2) in a dispersion liquid containing water or an organic solvent as a dispersion medium, and then forming powder by removing the dispersion medium.

7. The rubber composition for a tire according to claim 6, wherein the complex structure is a core-shell structure containing a non-diene polymer that is the crosslinkable oligomer or polymer (b2) and a diene polymer that is the crosslinkable oligomer or polymer (b1); and the complex structure is composed of a core part having greater than 50 mass % of the crosslinkable oligomer or polymer (b2) and a shell part having greater than 50 mass % of the crosslinkable oligomer or polymer (b1).

8. The rubber composition for a tire according to claim 1, wherein the complex structure is a microparticle obtained by crosslinking and micronizing the crosslinkable oligomer or polymer (b2) in the crosslinkable oligomer or polymer (b1) or the diene rubber (A).

9. The rubber composition for a tire according to claim 8, wherein the complex structure is a core-shell structure containing a non-diene polymer that is the crosslinkable oligomer or polymer (b2) and a diene polymer that is the crosslinkable oligomer or polymer (b1); and the complex structure is composed of a core part having greater than 50 mass % of the crosslinkable oligomer or polymer (b2) and a shell part having greater than 50 mass % of crosslinkable oligomer or polymer (b1).

10. The rubber composition for a tire according to claim 1, wherein the complex structure is a core-shell structure containing a non-diene polymer that is the crosslinkable oligomer or polymer (b2) and a diene polymer that is the crosslinkable oligomer or polymer (b1); and the complex structure is composed of a core part having greater than 50 mass % of the crosslinkable oligomer or polymer (b2) and a shell part having greater than 50 mass % of the crosslinkable oligomer or polymer (b1).

11. The rubber composition for a tire according to claim 1, the rubber composition further comprising from 1 to 100 parts by mass of a carbon black and/or a white filler (C) per 100 parts by mass of the diene rubber (A).

12. The rubber composition for a tire according to claim 1, wherein the diene rubber (A) contains at least 50 mass % of a styrene-butadiene rubber.

13. The rubber composition for a tire according to claim 1, wherein the diene rubber (A) contains from 60 to 100 mass % of natural rubber.

14. A pneumatic tire comprising the rubber composition for a tire described in claim 1 in a tire tread.

15. A pneumatic tire comprising the rubber composition for a tire described in claim 10 in a tire tread.

* * * * *